United States Patent
Yanakawa et al.

(10) Patent No.: US 9,156,036 B2
(45) Date of Patent: Oct. 13, 2015

(54) METHOD OF SEPARATING WORKPIECES FROM CHIPS

(71) Applicants: Shozen Yanakawa, Saitama (JP); Hiroshi Kasuya, Saitama (JP); Kyota Kotake, Saitama (JP); Satoru Akimoto, Tokyo (JP); Takahiro Mogi, Nagano (JP); Youji Takeuchi, Saitama (JP); Umeo Tsuyusaki, Saitama (JP)

(72) Inventors: Shozen Yanakawa, Saitama (JP); Hiroshi Kasuya, Saitama (JP); Kyota Kotake, Saitama (JP); Satoru Akimoto, Tokyo (JP); Takahiro Mogi, Nagano (JP); Youji Takeuchi, Saitama (JP); Umeo Tsuyusaki, Saitama (JP)

(73) Assignees: Citizen Holdings Co. Ltd., Tokyo (JP); Citizen Machinery Co., Ltd., Nagano (JP)

( * ) Notice: Subject to any disclaimer, the term of this patent is extended or adjusted under 35 U.S.C. 154(b) by 0 days.

(21) Appl. No.: 14/583,917

(22) Filed: Dec. 29, 2014

(65) Prior Publication Data

US 2015/0114889 A1    Apr. 30, 2015

Related U.S. Application Data

(62) Division of application No. 13/992,561, filed as application No. PCT/JP2011/078746 on Dec. 13, 2011, now abandoned.

(30) Foreign Application Priority Data

Dec. 14, 2010  (JP) ................................. 2010-278108

(51) Int. Cl.
  *B03B 5/62*   (2006.01)
  *B08B 3/04*   (2006.01)
  *B23Q 7/12*   (2006.01)
  *B03B 5/00*   (2006.01)
  *B23Q 11/00*  (2006.01)

(52) U.S. Cl.
  CPC . *B03B 5/623* (2013.01); *B03B 5/00* (2013.01); *B08B 3/048* (2013.01); *B23Q 7/12* (2013.01); *B23Q 11/0075* (2013.01)

(58) Field of Classification Search
  CPC ............. B03B 5/28; B03B 5/00; B03B 5/38; B03B 5/623
  See application file for complete search history.

(56) References Cited

U.S. PATENT DOCUMENTS 2,150,226 A       3/1939  Kennedy
3,550,773 A   *  12/1970  Klibanoff et al. ............. 209/138

(Continued)

FOREIGN PATENT DOCUMENTS

EP    0972571 A2   1/2000
JP    4913981       2/1974

(Continued)

*Primary Examiner* — Howard Sanders
(74) *Attorney, Agent, or Firm* — Howson & Howson LLP

(57) ABSTRACT

There is provided a workpiece separation apparatus permitting input of a mixture of workpieces and chips stably within a flow current and separating them accurately and efficiently. The workpiece separation apparatus includes an input cylinder inserted within a separating container, and a fluid supplying means arranged so as to supply fluid to the separating container from a part lower than a lower end of the input cylinder, and configured such that the fluid overflows and flows out of the upper end of the separating container due to a flow current generated within the separating container, and such that the level of the fluid rises up in the input cylinder and the fluid does not flow out of the upper end of the input cylinder, but is maintained substantially in a resting state and at a level above the level of the upper end of the separating container.

10 Claims, 7 Drawing Sheets

(56) References Cited

U.S. PATENT DOCUMENTS

| | | |
|---|---|---|
| 3,642,129 A | 2/1972 | McDaniel et al. |
| 5,855,691 A | 1/1999 | Oram et al. |
| 5,902,376 A | 5/1999 | Currie |
| 5,944,196 A | 8/1999 | Oram et al. |
| 6,244,446 B1 | 6/2001 | Schmittel |

FOREIGN PATENT DOCUMENTS

| | | |
|---|---|---|
| JP | 57-149935 U | 9/1982 |
| JP | 57149935 | 9/1982 |
| JP | 6279858 A | 4/1987 |
| JP | 2007330855 | 12/2007 |
| WO | 9622834 A1 | 8/1996 |

* cited by examiner

METHOD OF SEPARATING WORKPIECES FROM CHIPS

CROSS-REFERENCE TO RELATED APPLICATION

This application is a division of application Ser. No. 13/992,561, filed Jun. 7, 2013. The disclosure of application Ser. No. 13/992,561 is incorporated by reference

FIELD OF THE INVENTION

The invention relates to a workpiece separation method for separating workpieces machined by various machine tools from chips produced in machining the workpieces.

BACKGROUND OF THE INVENTION

Because size of minute workpieces, e.g., parts of a watch, machined by various micromachining machine tools such as a micromachining lathe and a milling machine is in microns, it is difficult to take out only machined workpieces by separating from chips such as cutting chips, and such workpieces are often taken out of the machine tool as a mixture with chips.

While such workpieces are separated and taken out of the mixture of the workpieces and chips by such methods of rising, screening and separation by means of a vibration plate, it is difficult to separate them accurately and efficiently because the workpieces and chips are produced from the same material and have the same specific weight and because the chips are mixed with various shapes of chips. Therefore, it has been required to select them visually in the end.

Technology enabling separation by differences in shapes and surface areas with respect to mass, even if the material and specific weight are the same, is embodied in a separation apparatus configured to separate chip parts plated by barrel plating from media used in plating the parts, disclosed in Laid-open Japanese Patent Application No. 2007-30855. It is then conceivable to separate the mixture of the workpieces and chips machined by the various machine tools by using this known separation apparatus.

This known separation apparatus includes a separating container within which fluid is reserved, and is configured such that a mixture of chip parts and media is input to the separating container from above the separating container so as to sediment the mixture. A fluid current flowing in a direction intersecting a direction of the sedimentation is caused to collide against the mixture on the way of the sedimentation to sediment the media to the lower part of the separating container to recover and the chip parts are separated from the media to recover through a bifurcating channel provided on a side of the separating container, as described in Laid-open Japanese Patent Application No. 2007-30855.

It is necessary for the mixture to be stably input to separate the mixture by colliding against the flow current. Specifically, it is extremely important to stably input the mixture of the workpieces and chips machined by various machine tools and having the same specific weight to separate them. However, the known separation apparatus described above generates the flow current so as to cross the fluid reserved within the separating container, and the mixture reaches to the flow current crossing a direction of sedimentation after sedimenting for a whole within the fluid in the separating container. Therefore, it is difficult to input the mixture stably within the flow current and hence, difficult to separate in high precision.

It is also conceivable to input the mixture directly into a flow current by generating the flow current from a lower part to an upper part of the separating container and by overflowing the fluid from the upper end of the separating container. However, the fluid overflowing and discharged around the upper end portion of the separating container is remarkably disturbed, and the mixture is required to pass through such disturbed layer. Then, it is difficult to input the mixture stably into the flow current and difficult to separate in high precision.

SUMMARY OF THE INVENTION

A first aspect of the invention solves the above-mentioned problems by providing a workpiece separation apparatus including a separating container in which fluid is stored, an input cylinder configured to input a mixture of workpieces and chips, and a fluid supplying means configured to supply the fluid to the separating container, wherein the input cylinder is disposed such that a lower end thereof is inserted and is located within the separating container, the fluid supplying means supplies the fluid to the separating container from a part lower than a lower end of the input cylinder, an upper end of the input cylinder projects above an upper end of the separating container, and the separating container and the input cylinder are arranged such that the fluid overflows and flows out of the upper end of the separating container by a flow current generated within the separating container from a lower part to an upper part thereof and such that the fluid within the input cylinder does not flow out of the upper end thereof.

A second aspect of the invention solves the above-mentioned problem by disposing the input cylinder such that a center line of the input cylinder is aligned with a center line of the separating container, in addition to the configuration of the workpiece separation apparatus described in the first aspect.

A third aspect of the invention solves the abovementioned problem by arranging such that the input cylinder has a funnel portion whose outer shape expands upward at the part projecting above the upper end of the separating container, in addition to the configuration of the workpiece separation apparatus described in the second aspect.

A fourth aspect of the invention solves the above-mentioned problem by providing a separating plate convexly formed toward the upper part of the funnel portion around a mixture input opening of the funnel portion, in addition to the configuration of the workpiece separation apparatus described in the third aspect.

A fifth aspect of the invention solves the above-mentioned problem by providing a plurality of fluid inflow holes for introducing the fluid into the separating container in a vicinity of the lower end of the separating container, in addition to the configuration of the workpiece separation apparatus described in any one of the first through fourth aspects.

A sixth aspect of the invention solves the above-mentioned problem by providing a ringed slit for introducing the fluid into the separating container in the vicinity of the lower end of the separating container, in addition to the configuration of the workpiece separation apparatus described in any one of the first through fourth aspects.

A seventh aspect of the invention solves the above-mentioned problem by constructing a bottom portion of the separating container to be removable, in addition to the configuration of the workpiece separation apparatus described in any one of the first through sixth aspects.

An eighth aspect of the invention solves the above-mentioned problem by providing an opening for discharging the separated and sedimented workpieces or chips together with the fluid at the bottom portion of the separating container, in addition to the configuration of the workpiece separation apparatus described in any one of the first through sixth aspects.

A ninth aspect of the invention solves the above-mentioned problem by forming an inclined surface inclined so as to guide the workpieces or chips separated from each other and sedimented to the opening on an inner circumferential surface on the bottom side of the separating container, in addition to the configuration of the workpiece separation apparatus described in the eighth aspect.

A tenth aspect of the invention solves the above-mentioned problem by disposing an upper receiving portion for receiving the fluid flown out of the upper end of the separating container around the upper portion of the separating container, in addition to the configuration of the workpiece separation apparatus described in any one of the first through ninth aspects.

An eleventh aspect of the invention solves the above-mentioned problem by forming a fluid guide portion having an inclined surface for guiding the fluid overflowing from the upper end of the separating container to the upper receiving portion at the upper end of the separating container, in addition to the configuration of the workpiece separation apparatus described in the tenth aspect.

According to the workpiece separation apparatus of the first aspect of the invention, the fluid supplying means is configured to supply the fluid to the separating container from the part lower than the lower end of the input cylinder; a flow current from the lower part to the upper part of the separating container is generated. The upper end of the input cylinder projects above the upper end of the separating container and the lower end thereof is located within the separating container, so that no flow current that flows out of the upper end of the input cylinder is generated even if a fluid level of the fluid within the input cylinder rises up due to dynamic pressure of the flow current.

With this arrangement, the mixture of the workpieces and chips input from the upper end of the input cylinder sediments to the lower end of the input cylinder in which the fluid is hardly influenced by the flow currents within the separating container and is stable having very little flow currents. Then, the mixture can reach a part where relatively stable flow current is generated and can be supplied to the separating flow currents, so that it is possible to separate the workpieces and chips in the mixture to the upper and lower parts of the separating container accurately and efficiently even if their specific weights are the same.

According to the workpiece separation apparatus of the second aspect of the invention, the shape of the channel of the flow current within the separating container can be formed to be rotational symmetrical with respect to the center line and the flow current heading from the lower part to the upper part is dispersed homogeneously when the flow current flows into the separating container, i.e., around the input cylinder, so that it is possible to separate the workpieces accurately and efficiently without causing less disturbance of flow rate and current velocity.

According to the workpiece separation apparatus of the third aspect of the invention, an area of the upper end of the input cylinder is widened, so that the mixture of the workpieces and chips can be readily input from above the input cylinder.

According to the workpiece separation apparatus of the fourth aspect of the invention, it is possible to improve the performance for separating the workpieces from the chips.

According to the workpiece separation apparatus of the fifth or sixth aspect of the invention, the fluid is introduced into the separating container homogeneously through the plurality of fluid inflow holes provided in the vicinity of the lower end of the separating container or through the ringed slit provided in the vicinity of the lower end of the separating container, so that it is possible to generate flow currents from the lower part to the upper part stably within the separating container without generating turbulence and eddy currents.

According to the workpiece separation apparatus of the seventh aspect of the invention, the separated, sedimented and accumulated workpieces or the chips can be recovered simply by removing only the bottom portion of the separating container, so that it is not necessary to remove the whole separating container and to facilitate the workpiece recovering works.

According to the workpiece separation apparatus of the eighth aspect of the invention, the workpieces separated from the chips or the chips can be discharged together with the fluid, so that it is possible to easily recover the workpieces or the chips by readily separating the workpieces or the chips from the fluid by using an adequate workpiece and fluid separating means such as a basket.

According to the workpiece separation apparatus of the ninth aspect of the invention, it is possible to avoid the workpieces or chips sedimented within the separating container from stagnating and to guide them smoothly to the lower opening.

According to the workpiece separation apparatus of the tenth aspect of the invention, the fluid overflowing together with the separated chips or workpieces from the upper end of the separating container can be collected by the upper receiving portion and to guide appropriately to the discharge portion, so that the works for recovering the chips and workpieces can be facilitated.

According to the workpiece separation apparatus of the eleventh aspect of the invention, the fluid flows smoothly from the upper end of the separating container to the upper receiving portion, so that the chips can be readily and smoothly guided to the upper receiving portion together with the fluid.

DETAILED DESCRIPTION OF THE PREFERRED EMBODIMENTS

Figure 1:
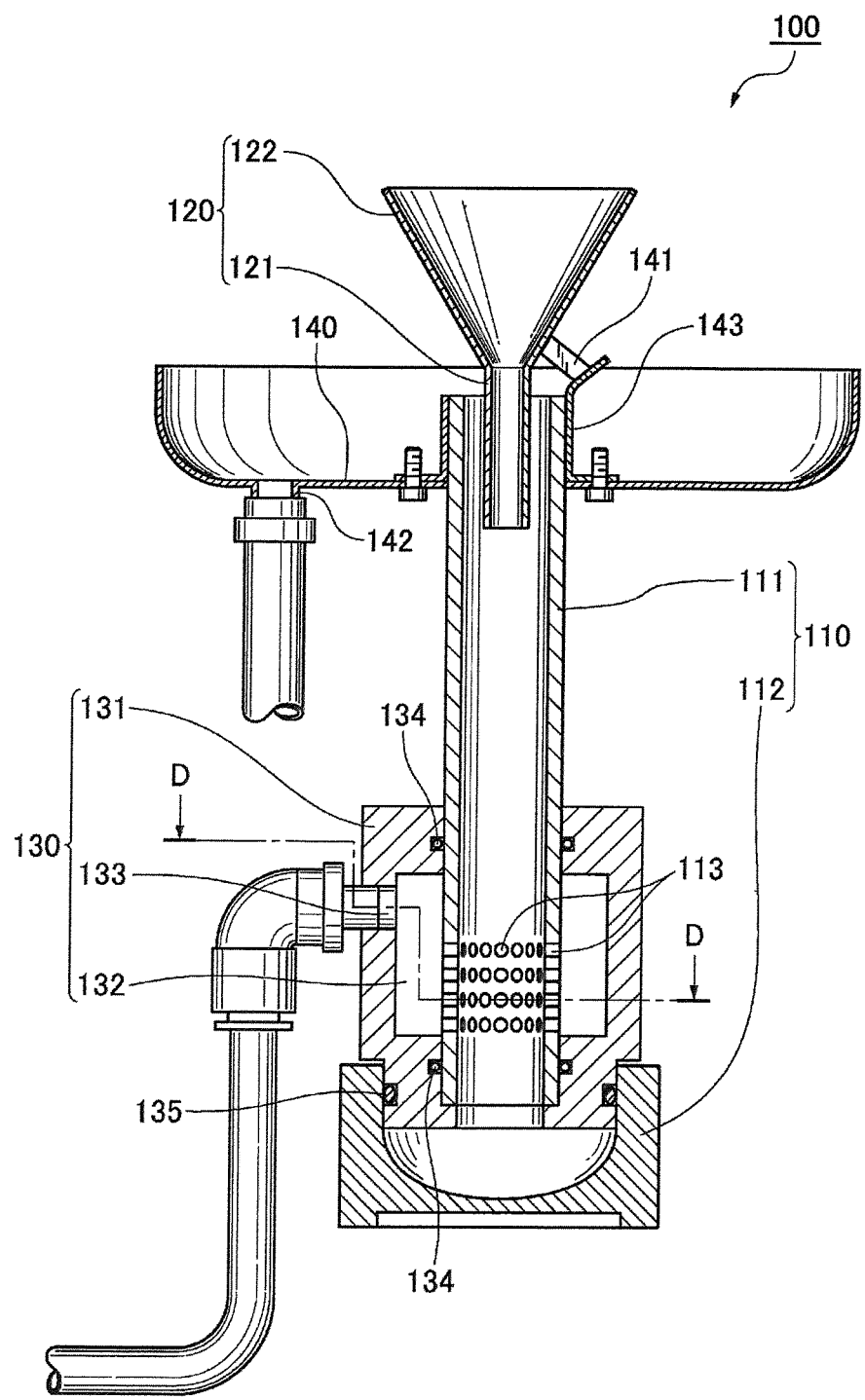
FIG. 1 is a side section view of a workpiece separation apparatus of one embodiment of the invention.

As shown in FIG. 1, a workpiece separation apparatus 100 of one embodiment of the invention includes a separating container 110, an input cylinder 120 having a cylindrical portion 121 whose diameter is smaller than an inner circumference of the separating container 110 and a funnel portion 122 that expands upward, a fluid supplying means 130 configured to supply fluid from a lower part of the separating container 110, and an upper receiving portion 140 for receiving the fluid flown out of an upper end of the separating container 110.

The separating container 110 includes a tubular portion 111 and a bottom portion 112 removably constructed at a lower end portion of the tubular portion 111 (through the intermediary of the fluid supplying means 130 as described later in the present embodiment)

A plurality of fluid inflow ports 113 is dispersed in vertical and circumferential directions at a lower part of the tubular portion 111. The fluid inflow ports 113 are disposed substantially homogeneously across the whole outer circumference of the tubular portion 111.

The cylindrical portion 121 is inserted into an inner circumferential side of the upper part of the tubular portion ill such that their center lines are aligned with each other, and the upper receiving portion 140 is disposed around an outer circumference of the tubular portion ill. Thereby, a gap between an outer circumferential surface of the cylindrical portion 121 of the input cylinder 120 and an inner circumferential surface of the separating container 110 is substantially equalized.

The cross-sectional shape of the tubular portion 111 of the separating container 110 and the cylindrical portion 121 of the input cylinder 120 may be any shape, e.g., polygonal and elliptical shapes.

The upper receiving portion 140 is fixed to the separating container 110 by fitting a container fixing member 143 provided at a center of the upper receiving portion 140 around the tubular portion 111 of the separating container 110. The upper receiving portion 140 is also provided with a fluid discharge port 142.

The container fixing member 143 is provided with a fixing member 141 for fixedly supporting the input cylinder 120. The input cylinder 120 is supported such that a lower end of the cylindrical portion 121 is located above the fluid inflow ports 113 described above and such that an upper end of the funnel portion 122 is located above an upper end portion of the tubular portion 111.

The structures for fixing the upper receiving portion 140 to the tubular portion 111 and for fixing the input cylinder 120 to the upper receiving portion 140 are not limited to those of the embodiment described above, and may be any structure.

Figure 2:
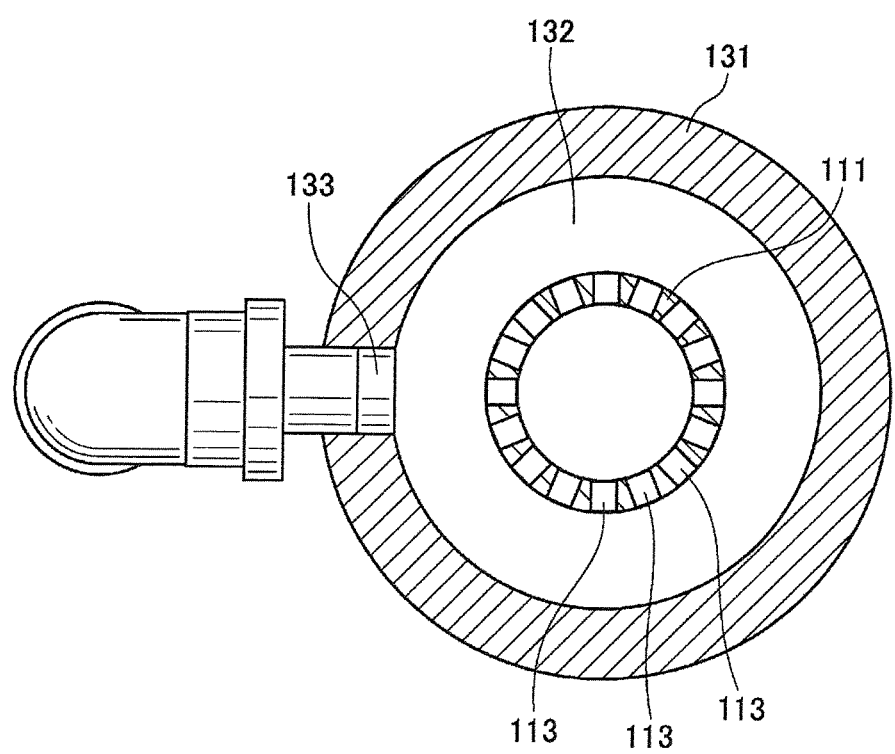
FIG. 2 is a section view taken along a line D-D in FIG. 1.

As shown in FIGS. 1 and 2, the fluid supplying means 130 is composed of a supply cylinder 131 fittingly fixed so as to face the fluid inflow ports 113 at the lower part of the tubular portion 111, a fluid reservoir 132 formed between the supply cylinder 131 and the tubular portion 111, and a supply port 133 configured to supply the fluid to the fluid reservoir 132.

The fluid reservoir 132 is formed of a large hole formed within the supply cylinder 131. Parts where the supply cylinder 131 fits with the tubular portion ill are kept to be fluid-tight by seals 134. The fluid supplied from the supply port 131 to the fluid reservoir 132 flows homogeneously into the tubular portion 111 through the fluid inflow ports 113.

In the present embodiment, the supply cylinder 131 is constructed so as to cover a lower end outer circumferential portion of the tubular portion 111, and the bottom portion 112 is removably and fittingly fixed to a lower end portion of the supply cylinder 131.

Parts where the lower end portion of the supply cylinder 131 fits with the bottom portion 112 are kept to be fluid-tight by seals 135.

The structure of the fluid supplying means 130 is not limited to that of the embodiment described above. For instance, the supply cylinder may be configured such that the bottom portion of the separating container is directly and removably attachable to the tubular portion. The fluid may be supplied to the tubular portion by configuring the supply port as fluid inflow ports of the tubular portion without providing the supply cylinder and the fluid reservoir.

The fluid to be supplied may be any kind of fluid such as water, oil, an aqueous solution, and oils and fats in which another component is dissolved or mixed depending on such conditions as objects to be separated and an environment where the apparatus is installed. The fluid may also have any viscosity, specific weight, chemical and electrical characteristics and others, which may be appropriately selectable.

Next, flows of the fluid in the workpiece separation apparatus 100 and operations for separating workpieces from chips according one embodiment of the invention will be explained.

Figure 3:
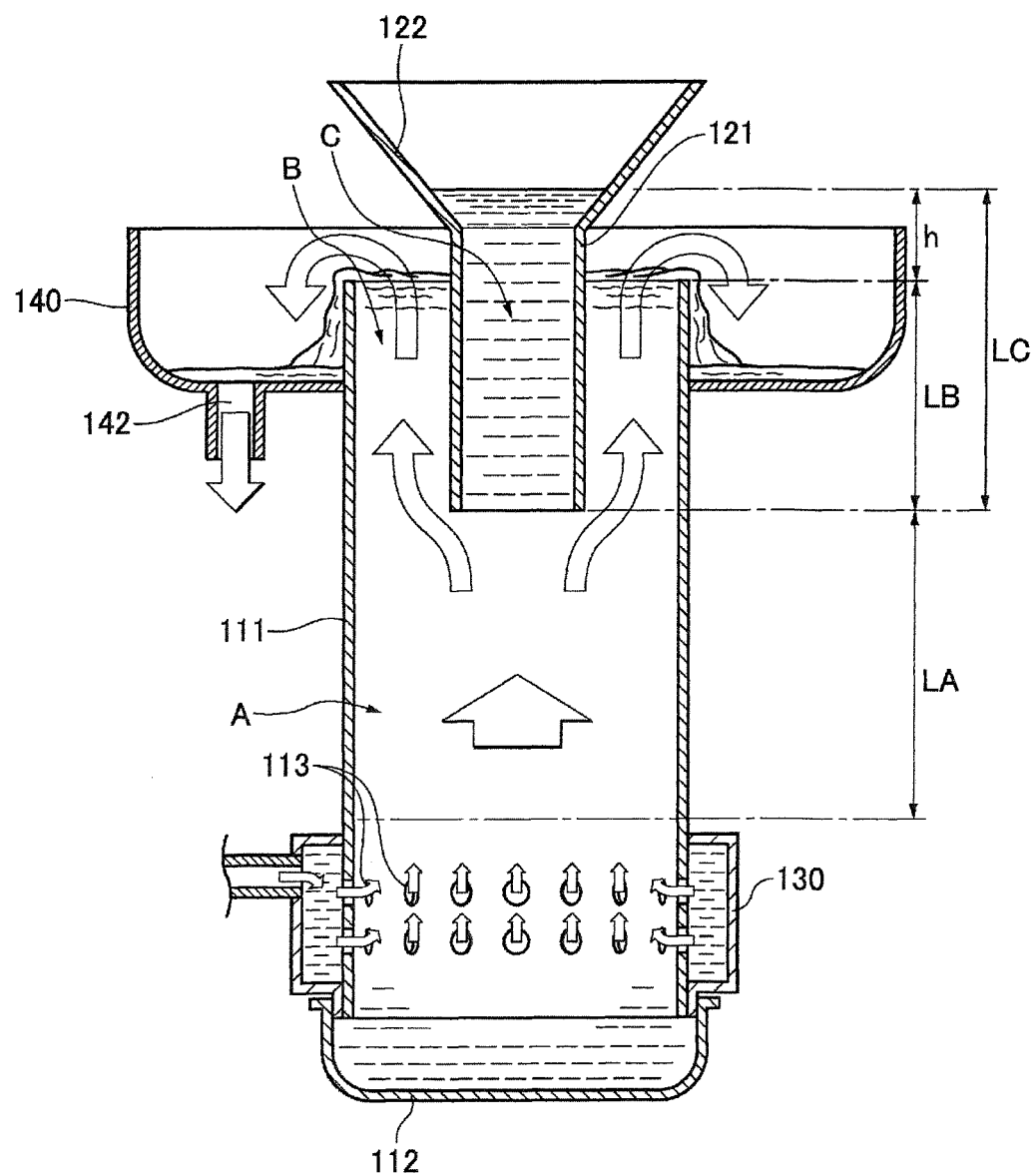
FIG. 3 is a schematic section view explaining current flows within the workpiece separation apparatus of the invention.
Figure 4:
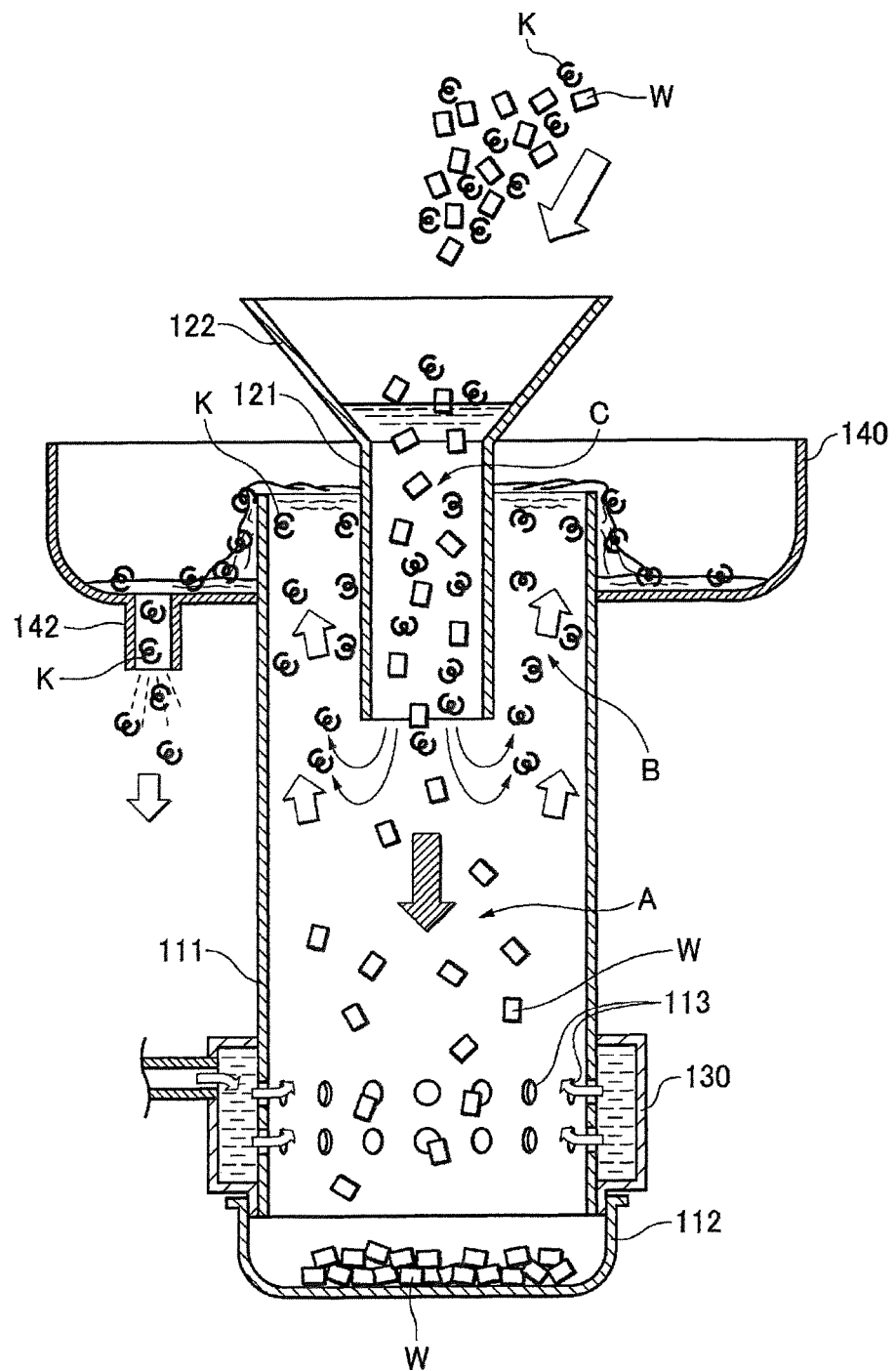
FIG. 4 is a schematic section view explaining operations for separating workpieces from chips of the workpiece separation apparatus of the invention.

As schematically shown by arrows in FIG. 3, the fluid supplied from the fluid supplying means 130 substantially homogeneously and circumferentially through the fluid inflow ports 113 forms fluid currents substantially homogeneously from the lower part to the upper part of the tubular portion 111, flows out of the upper end portion of the tubular portion 111, and is discharged out of the discharge port 142 of the upper receiving portion 140.

Fluid A in a section LA from the upper part of the fluid inflow holes 113 to the lower end of the cylindrical portion 121 of the input cylinder 120 is a homogeneous flow current flowing from the lower part to the upper part of the tubular portion 111.

Fluid B from a section LB from the lower end of the cylindrical portion 121 to the upper end of the tubular portion 111 is also a homogeneous flow current flowing from the lower part to the upper part of the tubular portion 111.

Current velocity of the fluid B of this section LB is faster than that of the section LA because a cross-sectional area of the channel of this section LB is smaller than that of the section LA. The current velocity of the fluid A in the section LA and the current velocity of the fluid B in the section LB are both set by controlling a quantity of the fluid supplied from the fluid supplying means 130 such that only the workpieces sediment and such that only the chips are flown upward.

The current velocity may be equalized by equalizing the cross-sectional areas of the channels of the fluid A in the section LA and the fluid B in the section LA by reducing an inner diameter of the section LA of the tubular portion ill of the separating container 110 and by increasing an inner diameter of the section LB.

Meanwhile, a fluid C within the input cylinder 120 is kept still and causes no current that flows out of the upper part of the input cylinder 120 by dynamic pressure caused by the flow current of the fluid A in the section LA in a condition in which a fluid level is higher than the upper end of the tubular portion 111 by height h corresponding to the dynamic pressure in a state in which the mixture of the workpieces W and the chips K is not input.

When only the mixture of the workpieces W and the chips K is input from the state in which the fluid C within the input cylinder 120 is kept still as described above, the fluid C within the input cylinder 120 is stabilized substantially in the resting state, and the workpieces W and the chips K in the mixture slowly change their postures and sediment dispersedly due to resistance of the fluid C substantially in the resting state.

When the mixture of the workpieces W and the chips K is input to the input cylinder 120 intermittently together with cutting fluid by a discharge mechanism or the like built in a machine tool, a fluid level of the fluid C rises by the cutting fluid when the mixture is input. Then, corresponding to an input amount of the cutting fluid, the fluid C within the input cylinder 120 generates a current from the upper part to the lower part of the input cylinder 120 for a predetermined time after the input, current velocity of the fluid B of the section LB increases, and after that, the fluid C within the input cylinder 120 is stabilized in a resting state.

When the mixture is input continuously, the fluid level of the fluid C always rises more than the fluid level of the fluid C in the resting state corresponding to an input amount of the cutting fluid, a current from the upper part to the lower part is generated, and current velocity of the fluid B in the section LB increases.

In this case, the workpieces W and the chips K in the mixture slowly change their postures and sediment dispersedly due to resistance of the fluid C substantially in the resting state by assuring a certain length of a section LC from an upper end surface of the fluid C within the input cylinder 120 to the lower end of the input cylinder 120 and by increasing a capacity of the input cylinder 120 by a certain degree. The increase of the current velocity of the fluid B in the section LB may be set within a range that does not affect the separating performance.

That is, even when the mixture is input continuously together with the cutting fluid, the length of the cylindrical portion 121 is set such that the workpieces W and the chips K in the mixture slowly change their postures and sediment dispersedly within the fluid C in the section LC. The position of the upper end of the input cylinder 120 is also set such that the fluid does not flow out of the upper part of the input cylinder 120 even when any kind of mixture is input.

When the mixture of the workpieces W and the chips K is input to the input cylinder 120 of the workpiece separation apparatus 100 configured as described above, the workpieces W and the chips K slowly change their postures and sediment dispersedly within the fluid C in the input cylinder 120, and reach from the lower end of the input cylinder 120 to the fluid A in the section LA.

Because the current velocity of the fluid A in the section LA is set in advance such that only workpieces sediment and only the chips are flown upward, the workpieces W sediment against the flow current even when the workpieces W reach the fluid A in the section LA of the tubular portion 111 and are accumulated on the bottom portion 112.

The chips K are flown upward by the flow currents of the fluid A in the section LA and the fluid B in the section LB, overflow from the upper end of the tubular portion ill together with the fluid, and flow out in a direction of the discharge port 142 of the upper receiving portion 140.

The separated workpieces W can be recovered by stopping the input of the mixture of the workpieces W and the chips K and the supply of the fluid from the fluid supplying means 130 and by removing the bottom portion 112.

The separated chips K can be recovered by an adequate method by installing a mesh finer than the chips K at an appropriate position within the upper receiving portion 140 or the discharge port 142 or downstream the discharge port 142.

The fluid A in the section LA around the lower end of the input cylinder 120 generates turbulence more or less, flowing the workpieces W in the direction of the section LB or flowing the chips K downward to the section LA.

There is also a case when the workpieces W and the chips K are flown together in contact with each other and sediment together for a while within the flow currents.

When the downward current is generated in the fluid C as described above, there is a case when the mixture is input to the section LA together with the downward flow current whose current velocity is relatively fast.

However, it is possible to reliably separate them by suppressing the workpieces W from reaching the upper end of the tubular portion 111 or the chips K from reaching the bottom portion 112 by assuring a section not affected by the turbulence or by assuring a distance by which the workpieces W and the chips K are separated by the flow currents. Specifically, the length of the section LA is set to be sufficient for separating the workpieces W from the chips K during when the mixture sediments in the section LA.

While the case of separating the workpieces W from the chips K by sedimenting the workpieces W at the lower part of the separating container 110 and rising up the chips K to the upper part of the separating container 110 in the embodiment described above, it is possible to rise up the workpieces W to the upper part of the separating container 110 and to sediment the chips K to the lower part of the separating container 110 depending on shapes, material and others of the workpiece w.

Figure 5:
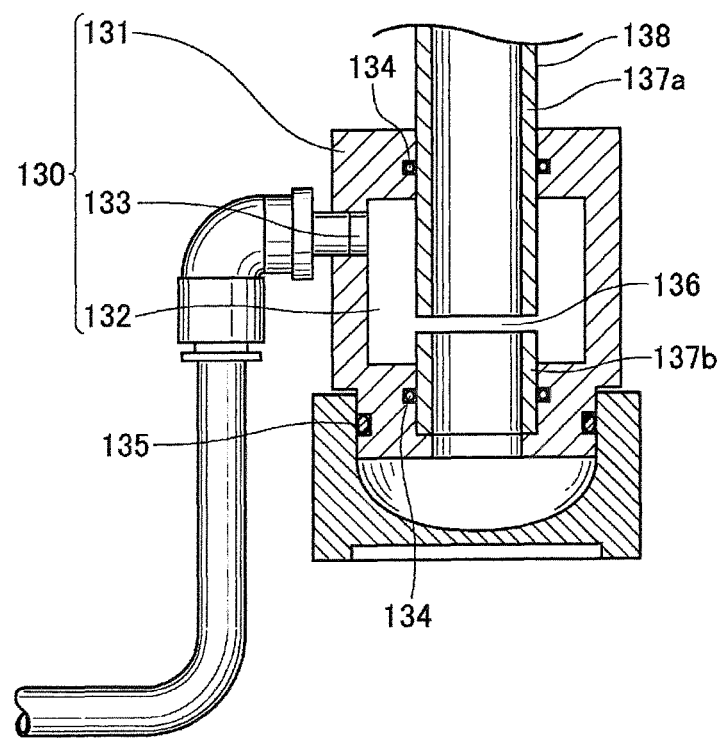
FIG. 5 is a partial section view of another embodiment of the workpiece separation apparatus of the invention.

As shown in FIG. 5, it is also possible to separate two cylindrical members 137a and 137b in the vertical direction and to form a tubular portion 138 by integrally fixing the supply cylinder 131. That is, it is possible to form a ringed slit 136 in the whole circumferential direction by a gap between the both cylindrical members 137a and 137b and to introduce the fluid into the separating container 110 through the slit 136. The fluid flows into the tubular portion 138 homogeneously from the slit 136, so that it is possible to form flow currents substantially homogeneously from the lower part to the upper part of the tubular portion ill and to stably separate the workpieces W from the chips K. It is possible to control a flow rate of the fluid introduced into the separating container 110 and to control current velocity of the fluid by adjusting a width of the slit 136.

A modified example of the configuration around the fluid supplying means 130 will now be explained with reference to FIG. 6.

Figure 6:
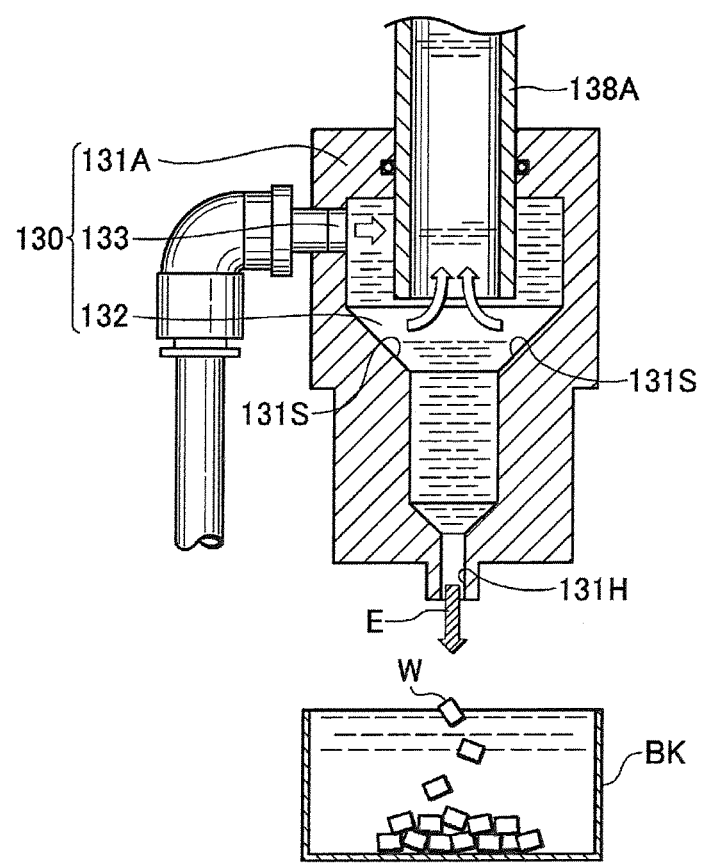
FIG. 6 is a partial section view of a still other embodiment of the workpiece separation apparatus of the invention.

As shown in FIG. 6, the separating container 110 is constructed by integrally fixing a cylindrical supply cylinder 131A to a lower end portion of a tubular portion 138A in this modified example. The fluid supplying means 130 has the supply cylinder 131A and the fluid reservoir 132, i.e., a space within the cylinder of the supply cylinder 131A, and the lower end of the tubular portion 138A is disposed within the fluid reservoir 132. An opening 131H that discharges fluid E out of the fluid reservoir 132 is formed at a lower part (bottom) of the supply cylinder 131A.

With this arrangement, the fluid supplied from the supply port 133 provided in the supply cylinder 131A to the fluid reservoir 132 is supplied to the tubular portion 138A from the lower end of the tubular portion 138A, so that a flow current from the lower part to the upper part is generated within the tubular portion 138A and the workpieces W separated from the chips K are discharged out of the opening 131H together with the fluid E. The opening 131H is set such the fluid E is discharged with less flow rate than that forming the flow current within the tubular portion 138A. Thereby, it is possible to readily separate the fluid E and the workpieces W by causing the fluid E to flow an appropriate workpiece and fluid separating means such as a meshed basket. Thereby, the workpieces W can be readily separated and recovered.

An inclined surface 131S formed such that an inner diameter of the supply cylinder 131A is reduced downward is formed at part of the supply cylinder 131A lower than the lower end of the tubular portion 138A among inner wall surfaces of the supply cylinder 131A.

The inclined surface 131S guides the workpieces W sedimenting within the separating container 110 toward the opening 131H and permits to avoid the workpieces W from stagnating on the bottom side of the separating container 110.

Next, a modified example of the configuration around the upper receiving portion 140 will be explained with reference to FIG. 7.

Figure 7:
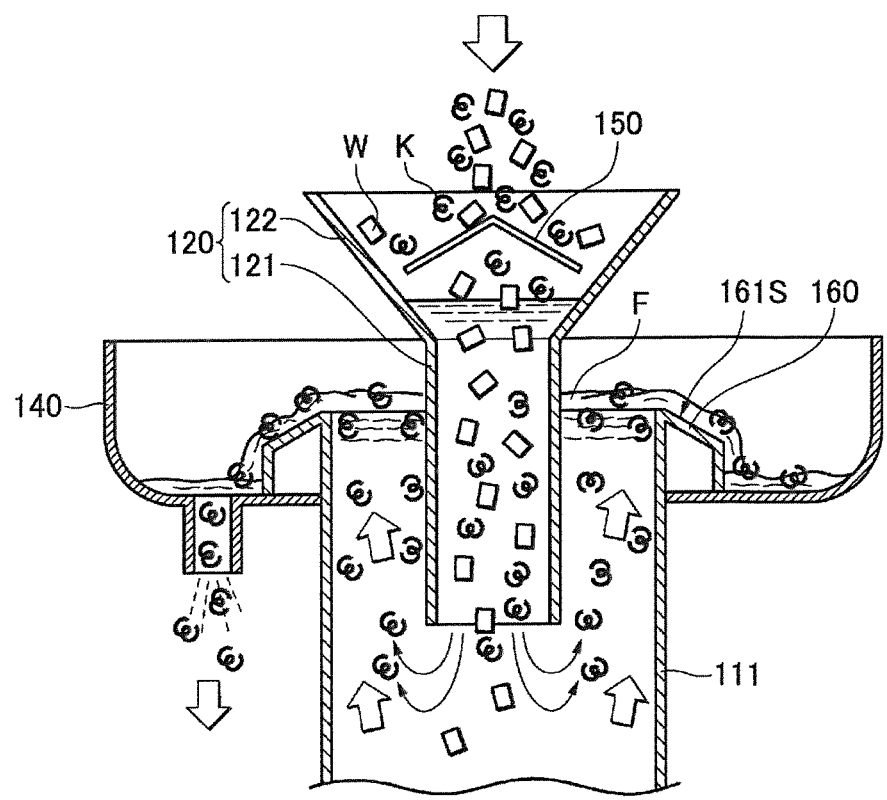
FIG. 7 is a partial section view of a different embodiment of the workpiece separation apparatus of the invention.

As shown in FIG. 7, a separating plate 150 convexly formed toward the upper part of the funnel portion 122 is provided around the mixture input opening of the funnel portion 122. Therefore, the mixture of the workpieces W and the chips K can be input by hitting against the separating plate 150, so that it is possible to prevent the mixture of the workpieces W and the chips K from being input in a lump to the center of the funnel portion 122. Accordingly, it is possible to disperse the mixture of the workpieces W and the chips K around the outer circumferential side of the funnel portion 122 and to improve the performance for separating the workpieces W and the chips K in the mixture.

Because a fluid guide portion 160 having an inclined surface 161S that guides the fluid F overflowing from the upper end of the separating container 110, i.e., from the upper end of the tubular portion 111, to the upper receiving portion 140 is formed at the upper end of the separating container 110, the fluid F flows smoothly from the upper end of the separating container 110 to the upper receiving portion 140 and it becomes easy to guide the chips K together with the fluid F smoothly to the upper receiving portion 140.

What is claimed is:

1. A method of separating workpieces and chips using an apparatus comprising a separating container holding a fluid, said separating container having an upper end; an input cylinder through which a mixture of workpieces and chips can be introduced into said separating container, said input cylinder having an upper end above the upper end of the separating container, extending downward into said separating container, and having a lower end within the fluid in said separating container, whereby a portion of the fluid within said separating container is also within said input cylinder; and means for supplying fluid to the separating container through at least one inlet passage located below the lower end of the input cylinder; the method comprising:

introducing a mixture of workpieces and chips into said separating container through said input cylinder; and supplying a fluid to the separating container, using said means for supplying fluid, thereby generating an upward flow of fluid within said separating container and causing said fluid, along with chips from said mixture, to overflow the upper end of the separating container;

wherein said supplying of fluid is carried out at a rate such that, while said mixture of chips and workpieces is introduced into said separating container through said input cylinder, the fluid in said input cylinder is maintained substantially in a resting state and at a level above the level of said upper end of the separating container.

2. The method of separating workpieces and chips according to claim 1, wherein said mixture of chips and workpieces is introduced into the input cylinder through a funnel connected to said upper end of the input cylinder.

3. The method of separating workpieces and chips according to claim 1, wherein said mixture of chips and workpieces is introduced into the input cylinder through a funnel connected to said upper end of the input cylinder, and wherein, in the introduction of said mixture of workpieces and chips into the input cylinder, said mixture is dropped onto, and dispersed by, an upwardly convex separating plate within said funnel.

4. The method of separating workpieces and chips according to claim 1, wherein said means for supplying fluid to the separating container comprises a plurality of passages located below the lower end of the input cylinder, and wherein the step of supplying a fluid to the separating container is carried out by introducing fluid through said plurality of passages.

5. The method of separating workpieces and chips according to claim 1, wherein fluid is introduced into the separating container through a ring-shaped slot in the separating container.

6. The method of separating workpieces and chips according to claim 1, including a step in which workpieces settled at the bottom of the separating container are retrieved by removing a bottom portion of the separating container.

7. The method of separating workpieces and chips according to claim 1, including a step in which workpieces settled at the bottom of the separating container are retrieved by discharging the settled workpieces together with fluid from within the separating container through a discharge opening at the bottom of the separating container.

8. The method of separating workpieces and chips according to claim 1, including a step in which workpieces are guided on an inclined inner circumferential surface of the separating container toward a discharge opening at the bottom of the separating container, and a step in which workpieces settled at the bottom of the separating container are retrieved by discharging the settled workpieces together with fluid from within the separating container through said discharge opening.

9. The method of separating workpieces and chips according to claim 1, in which fluid, along with chips from said mixture, overflows the upper end of the separating container and said fluid along with chips is received in an annular receiving trough disposed around the upper end of the separating container.

10. The method of separating workpieces and chips according to claim 1, in which fluid, along with chips from said mixture, overflows the upper end of the separating container and said overflowing fluid along with chips is guided by an inclined fluid guide into an annular receiving trough disposed around the upper end of the separating container.

\* \* \* \* \*